Sept. 20, 1927.

H. LEDWINKA 1,642,817

RESILIENT AXLE MOUNT FOR MOTOR VEHICLES

Filed April 12, 1926

Hans Ledwinka
Inventor

Patented Sept. 20, 1927.

1,642,817

UNITED STATES PATENT OFFICE.

HANS LEDWINKA, OF KOPRIVNICE, CZECHOSLOVAKIA.

RESILIENT AXLE MOUNT FOR MOTOR VEHICLES.

Application filed April 12, 1926, Serial No. 101,511, and in Czechoslovakia February 7, 1925.

The invention relates to the mounting of non-driven resiliently mounted swivelling or oscillating shaft portions or half axles for motor vehicles having a medial supporting member. The front part of this supporting member is constituted by the motor- and gear-case, which may if desired be combined to form a single unit.

According to the invention the oscillating or swivelling half axles, which are jointed to the medial supporting member of the vehicle, are connected by means of joints and resiliently mounted strut members with the upper part of the supporting member whereby a strong, resistant and at the same time light and simple construction of good supporting power and strong shock absorbing spring action is obtained. According further to the invention in order that the resilient shock-absorbing support of the shaft portions at the upper part of the framework may not unduly and unfavourably strain the material of the latter, the point of support of the spring shock-absorbing members on the framework is connected with the lower bearing joint of the shaft portion by means of a tie rod adapted to take up the tensional stress which arises.

Figure 1:
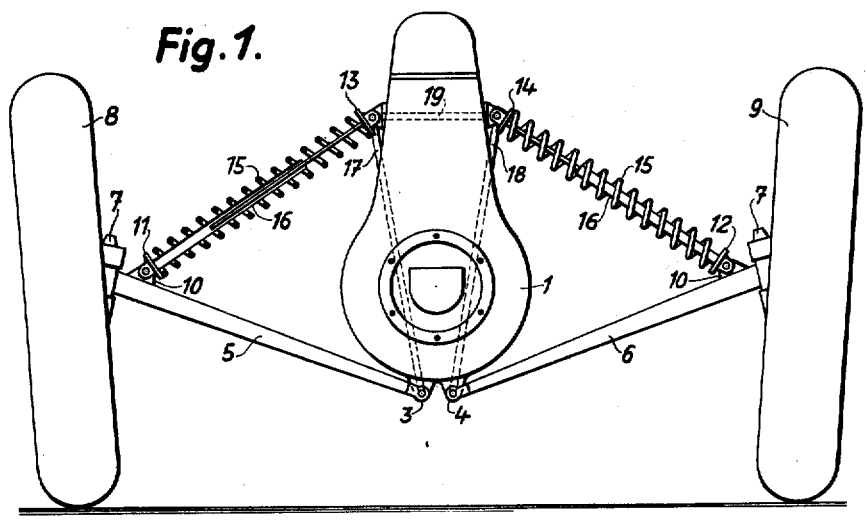
Figure 2:
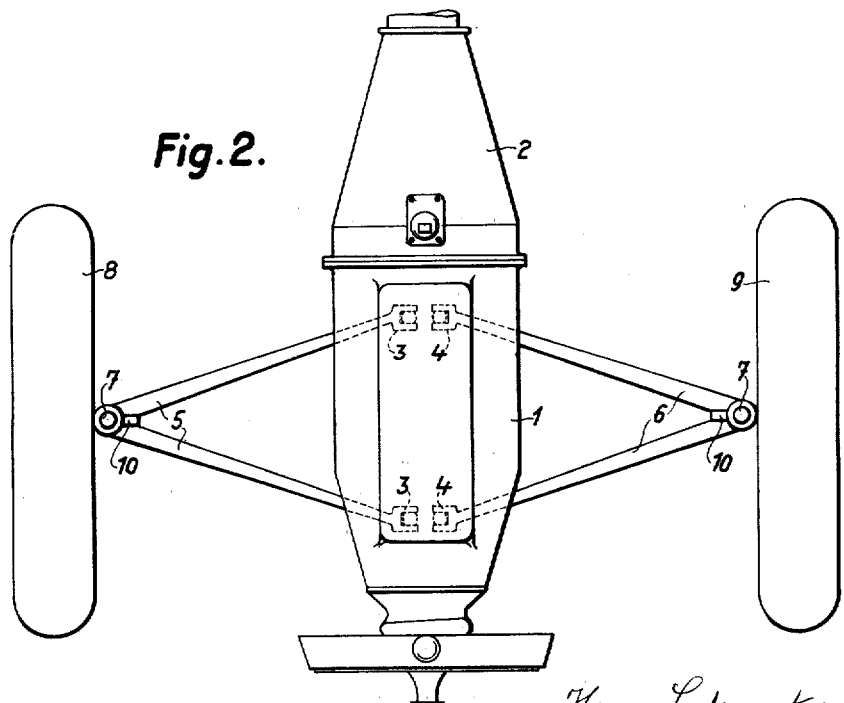

One constructional form according to the invention is illustrated diagrammatically by way of example in the accompanying, drawings, in which:

Fig. 1 is a front view of the arrangement of the front wheels of an automobile, and Fig. 2 is a plan corresponding to Fig. 1 with the spring members omitted.

In the example illustrated a gear case 2 is directly attached to a motor case 1 both cases 1 and 2 forming at the same time the front part of a medial supporting member of the vehicle. On the lower part of the motor case 1 joints 3, 4 are arranged close beside one another and serve for the reception of non-driven shaft portions or half-axles 5, 6, which latter are forked (Fig. 2) and carry at their free ends bearings 7 for the front wheels 8, 9 of the vehicle. End lugs 11, 12 are jointed in eyelets 10 near the free ends of the half-axles 5 and 6 and similar end lugs 13, 14 are jointed to the two sides of the upper part 1 of the framework. Pressure springs 15 are arranged between the lugs 11 and 13 and between the lugs 12 and 14 respectively, said springs being carried on guides 16 each consisting of two parts telescopically connected with one another. One of these guides 16 has its one part connected to the lug 11 and its other part to the lug 13, whilst the other guide 16 has its one part connected to the lug 12 and its other part to the lug 14. The joints of the lugs 13, and 14 are connected with the joints 3 and 4 of the half-axles by means of tension rods 17 and 18. Besides this the pins of the lugs 13 and 14 are connected by means of a common rod member or members 19. The arrangement of the parts is made in such a way that neither the tension rods 17 and 18 nor the rod member or members 19 come in the way of the motor in the case. For this purpose the guides 16 may for example be forked in similar manner to the shaft portions from the lugs 11 and 12 respectively and provided with two springs for each half-axle.

The mounting and spring suspension of the half-axles may be effected on the gear case 2 or on the common motor and gear case.

I claim:

1. In a motor vehicle, a medial supporting frame, a pair of independently swivelling half-axles having their inner ends pivotally connected to said frame, and an extensible strut pivotally connected between the outer portion of each half-axle and said frame for yieldingly maintaining said half-axles in normal position, the said strut for each half-axle being connected to said frame at a point vertically spaced from the pivoted inner end of the respective half-axle.

2. The structure as in claim 3 wherein each of said axles is pivoted to the said frame below the corresponding point of connection of the respective strut members.

3. The structure as in claim 3 in combination with tension members connecting the pivot of each half-axle to the inner pivot of the corresponding strut member.

4. In a motor vehicle, a longitudinal medial supporting member, a pair of swivelling half-axles, each half-axle comprising a rigid V fork, a bearing at the vertex of each fork for a vehicle wheel, and pivotal connections between the ends of each fork and the medial supporting member.

5. The structure as in claim 7 wherein extensible strut members connect the outer portion of each fork with the medial supporting member at points vertically spaced from the pivotal connections of the forks therewith.

6. Mounting for non-driven, resiliently mounted pivoted half-axles for motor vehicles having a longitudinal medial supporting member, a motor case and a gear case, both cases forming the front part of said medial supporting member, oscillating half-axles pivoted to one of said cases, and extensible strut members acted upon by compression springs connecting the outer end of each half axle with an upper part of the case.

7. Mounting for non-driven, resiliently mounted pivoted half-axles for motor vehicles having a longitudinal medial supporting member, a motor case and a gear case, both cases forming the front part of said medial supporting member, the oscillating half-axles pivoted to one of said cases, extensible strut members acted upon by compression springs for connecting the outer end of each half-axle with an upper part of the case, and tension rods, connecting the supporting point of the resilient strut member on the case with the pivot of the half-axle on said case.

HANS LEDWINKA.

porting member at points vertically spaced from the pivotal connections of the forks therewith.

6. Mounting for non-driven, resiliently mounted pivoted half-axles for motor vehicles having a longitudinal medial supporting member, a motor case and a gear case, both cases forming the front part of said medial supporting member, oscillating half-axles pivoted to one of said cases, and extensible strut members acted upon by compression springs connecting the outer end of each half axle with an upper part of the case.

7. Mounting for non-driven, resiliently mounted pivoted half-axles for motor vehicles having a longitudinal medial supporting member, a motor case and a gear case, both cases forming the front part of said medial supporting member, the oscillating half-axles pivoted to one of said cases, extensible strut members acted upon by compression springs for connecting the outer end of each half-axle with an upper part of the case, and tension rods, connecting the supporting point of the resilient strut member on the case with the pivot of the half-axle on said case.

HANS LEDWINKA.

CERTIFICATE OF CORRECTION.

Patent No. 1,642,817.      Granted September 20, 1927, to

HANS LEDWINKA.

It is hereby certified that error appears in the printed specification of the above numbered patent requiring correction as follows: Page 1, lines 92 and 96, claims 2 and 3, for the numeral "3" read "1"; same page, line 108, claim 5, for the numeral "7" read "4"; and that the said Letters Patent should be read with these corrections therein that the same may conform to the record of the case in the Patent Office.

Signed and sealed this 11th day of October, A. D. 1927.

Seal.

M. J. Moore,
Acting Commissioner of Patents.

CERTIFICATE OF CORRECTION.

Patent No. 1,642,817.   Granted September 20, 1927, to

HANS LEDWINKA.

It is hereby certified that error appears in the printed specification of the above numbered patent requiring correction as follows: Page 1, lines 92 and 96, claims 2 and 3, for the numeral "3" read "1"; same page, line 108, claim 5, for the numeral "7" read "4"; and that the said Letters Patent should be read with these corrections therein that the same may conform to the record of the case in the Patent Office.

Signed and sealed this 11th day of October, A. D. 1927.

Seal.

M. J. Moore,
Acting Commissioner of Patents.